United States Patent
Sato et al.

(10) Patent No.: US 10,351,467 B2
(45) Date of Patent: Jul. 16, 2019

(54) GLASS LINING, METHOD FOR MANUFACTURING GLASS LINING AND METHOD FOR CLEANING GLASS-LINED ARTICLES

(71) Applicant: HAKKO SANGYO CO., LTD., Nakatsu-shi, Oita (JP)

(72) Inventors: Katsuhiro Sato, Nakatsu (JP); Kenichi Fukuda, Nakatsu (JP)

(73) Assignee: HAKKO SANGYO CO., LTD., Nakatsu-shi (JP)

( * ) Notice: Subject to any disclaimer, the term of this patent is extended or adjusted under 35 U.S.C. 154(b) by 124 days.

(21) Appl. No.: 15/571,334

(22) PCT Filed: Jun. 1, 2016

(86) PCT No.: PCT/JP2016/066126
§ 371 (c)(1),
(2) Date: Nov. 2, 2017

(87) PCT Pub. No.: WO2016/194928
PCT Pub. Date: Dec. 8, 2016

(65) Prior Publication Data
US 2018/0072612 A1    Mar. 15, 2018

(30) Foreign Application Priority Data
Jun. 1, 2015    (JP) .................. 2015-111760

(51) Int. Cl.
*B32B 15/04*    (2006.01)
*B32B 17/06*    (2006.01)
(Continued)

(52) U.S. Cl.
CPC .............. *C03C 8/14* (2013.01); *B08B 7/0057* (2013.01); *C03C 8/02* (2013.01); *C03C 23/002* (2013.01);
(Continued)

(58) Field of Classification Search
USPC ......................... 428/426, 409, 469
See application file for complete search history.

(56) References Cited

U.S. PATENT DOCUMENTS 3,658,583 A    4/1972    Ogawa et al.
3,795,499 A    3/1974    Ogawa et al.
(Continued)

FOREIGN PATENT DOCUMENTS

DE    2046697 A1    9/1971
DE    10325768 A1    12/2004
(Continued)

OTHER PUBLICATIONS

Jul. 12, 2016 International Search Report issued in International Patent Application No. PCT/JP2016/066126.
(Continued)

*Primary Examiner* — Lauren R Colgan
(74) *Attorney, Agent, or Firm* — Oliff PLC

(57) ABSTRACT

A glass lining that has an excellent balance between a hydrophilic property and a hydrophobic property on its surface, that has less adhesion of dirt than a typical GL since having an excellent stain-proof property against both oily stains and aqueous stains, and that can maintain the stain-proof property and the self-cleaning performance for a long time after the glass lining is cleaned, leading to excellent cleaning performance and low dirt-adhesion. The glass lining includes a lining and a conductive inorganic compound contained in the lining. The glass lining is structured to have a plurality of hydrophilic concave portions and net-like hydrophobic convex portions connecting peripheries of the plurality of hydrophilic concave portions.

6 Claims, 5 Drawing Sheets

(51) Int. Cl.
*C03C 8/14* (2006.01)
*C03C 8/02* (2006.01)
*C03C 23/00* (2006.01)
*B08B 7/00* (2006.01)

(52) U.S. Cl.
CPC ...... *C03C 23/0075* (2013.01); *C03C 2207/04* (2013.01)

(56) References Cited

U.S. PATENT DOCUMENTS

| | | | | |
|---|---|---|---|---|
| 2008/0015102 | A1* | 1/2008 | Rosenflanz | C03B 17/06 501/53 |
| 2010/0238548 | A1* | 9/2010 | Watanabe | G02B 1/04 359/488.01 |
| 2012/0256091 | A1* | 10/2012 | Nakahashi | G01T 1/2018 250/361 R |
| 2013/0284257 | A1* | 10/2013 | Gilchrist | H01G 9/2068 136/256 |
| 2014/0106131 | A1* | 4/2014 | Ikai | G06F 3/041 428/172 |
| 2014/0178642 | A1* | 6/2014 | Milanovska | C03C 17/007 428/143 |
| 2015/0329755 | A1* | 11/2015 | Hakoshima | B32B 9/00 428/142 |
| 2016/0115340 | A1* | 4/2016 | Hashimoto | B32B 7/02 428/143 |
| 2016/0195642 | A1* | 7/2016 | Eguchi | B32B 7/02 359/601 |
| 2016/0221315 | A1* | 8/2016 | Saiki | B32B 27/36 |
| 2017/0139082 | A1* | 5/2017 | Takai | B32B 7/02 |
| 2018/0185875 | A1* | 7/2018 | Murakami | C03C 17/3417 |

FOREIGN PATENT DOCUMENTS

| | | |
|---|---|---|
| DE | 102011115379 A1 | 4/2013 |
| JP | S44-25715 B1 | 10/1969 |
| JP | S50-34017 A | 4/1975 |
| JP | H05-117877 A | 5/1993 |
| JP | H10-081544 A | 3/1998 |
| JP | H11-116273 A | 4/1999 |
| JP | 2005-200726 A | 7/2005 |
| JP | 2007-270295 A | 10/2007 |
| JP | 2007-270296 A | 10/2007 |
| JP | 2009-143781 A | 7/2009 |
| JP | 2009-143788 A | 7/2009 |
| JP | 2009-143789 A | 7/2009 |
| JP | 2009-197252 A | 9/2009 |
| JP | 4473642 B2 | 6/2010 |
| JP | 2011-162426 A | 8/2011 |
| WO | 2004/108846 A2 | 12/2004 |
| WO | 2008/018357 A1 | 2/2008 |

OTHER PUBLICATIONS

Aug. 7, 2018 Notice of Allowance issued in Japanese Patent Application No. 2017-521964.
Feb. 19, 2018 Office Action issued in German Patent Application No. 112016002450.9.

* cited by examiner

GLASS LINING, METHOD FOR MANUFACTURING GLASS LINING AND METHOD FOR CLEANING GLASS-LINED ARTICLES

TECHNICAL FIELD

The present invention relates to: a glass lining applied to devices such as a reactor used in a manufacturing process and the like of medicines, chemical products, foods, semiconductor materials, polymer materials and the like; a manufacturing method of the glass lining; and a cleaning method of glass-lined equipment provided with the glass lining, more specifically, the method capable of effectively cleaning the glass-lined equipment in a short time and maintaining a low dirt-adhesion of the glass-lined equipment for a long time after the glass-lined equipment is cleaned.

BACKGROUND ART

In a manufacturing process and the like of medicines, chemical products, foods, semiconductor materials, polymer materials and the like, a reactor and the like provided with a glass lining (hereinafter, also referred to as "GL") is used, in which glass is united at the high temperature on a surface of metal in order to protect the metal from erosive environments.

In case of a reactor, a transfer pipe and the like in which, for instance, an organic liquid or solid having a large specific resistance is used as contents, an attempt to improve an electrical continuity between a lining and a metal base material has been made in order to prevent electrification from being caused by static electricity generated between the contents and the lining.

For instance, Patent Literature 1, which is a patent granted to the Applicant of the present application, discloses a lining and a lining method of inhibiting the lining from being electrified by using a conductive oxide ceramics to provide electrical conductivity to the lining.

CITATION LIST

Patent Literature(s)

Patent Literature 1: Japanese Patent No. 4473642

SUMMARY OF THE INVENTION

Problem(s) to be Solved by the Invention

The above typical technique has disadvantages as follows.

(1) In recent years, domestic pharmaceutical companies and chemical companies have gradually specialized in manufacturing of high-value-added products. Further, GL products suitable for manufacturing a high-quality product with a high purity have been demanded while an efficient cleaning operation has been desired.

(2) The lining of Patent Literature 1 not only can inhibit electrification of the lining while maintaining corrosion resistance and surface gloss of the lining but also can improve basicity resistance, thermal shock resistance, wear resistance and exhibit an excellent low-dirt-adhesion. However, once dirt adheres to the lining of Patent Literature 1, dirt tends to gradually easily adhere thereto.

(3) When a reactor is particularly used for manufacturing different types of products while the reactor is cleaned in every batch, the cleaning of the reactor requires a complicated operation and a lot of working time in order to prevent contamination. For this reason, there has been strongly desired a development of a cleaning method capable of efficiently cleaning the reactor in a short time and maintaining a self-cleaning performance inherent in glass for a long time after the reactor is cleaned.

An object of the invention is to achieve the above demand, specifically, to provide: a glass lining having a surface structure in an excellent balance between a hydrophilic property and a hydrophobic property, having an excellent stain-proof property against both oily stains and aqueous stains, having less adhesion of dirt than a typical GL, and being capable of maintaining a stain-proof property and a self-cleaning performance for a long time after the glass lining is cleaned, leading to excellent cleaning performance and low-dirt-adhesion; a manufacturing method of the glass lining; and a cleaning method of glass-lined equipment for recovering an inherent low dirt-adhesion of the glass-lined equipment by an easy and efficient cleaning in a short time, so that dirt is less likely to adhere on the glass-lined equipment and the glass-lined equipment can maintain a stain-proof property and a self-cleaning performance for a long time after the glass-lined equipment is cleaned, the method being excellent in an efficiency and a reliability of the cleaning and a stability and a reliability of cleaning effects.

Means for Solving the Problem(s)

In the invention for solving the above disadvantage, a glass lining, a manufacturing method of the glass lining, and a cleaning method of glass-lined equipment have arrangements as follows.

According to an aspect of the invention, a glass lining includes a lining and a conductive inorganic compound contained in the lining and having a structure including: a plurality of hydrophilic concave portions; and net-like hydrophobic convex portions connecting peripheries of the plurality of hydrophilic concave portions.

In the above aspect of the invention, the following functions and advantages are obtained.

(1) Since the plurality of hydrophilic concave portions and the net-like hydrophobic convex portions connecting peripheries of the plurality of hydrophilic concave portions are formed, a hydrophilic property and a hydrophobic property are well balanced on the surface. Since a stain-proof property is excellent against both oily stains and aqueous stains, the glass lining has less adhesion of dirt than a typical GL and can maintain the stain-proof property and a self-cleaning performance for a long time after the glass lining is cleaned, resulting in excellent stability and durability of the cleaning effects.

(2) Since an oily liquid and oily stains are less likely to adhere on the hydrophilic concave portions but adhere only on the hydrophobic convex portions surrounding the concave portions, a cleaning liquid enters the concave portions during cleaning to easily float and wash away the oily liquid and oily stains present on the concave portions, thereby providing the glass lining excellent in the stain-proof property and cleaning performance against the oily stains.

(3) Since the hydrophobic convex portions are formed surrounding the hydrophilic concave portions, an aqueous liquid and aqueous stains are divided by the convex portions and are less likely to spread over the surface, so that the cleaning liquid easily washes away the aqueous liquid and aqueous stains, thereby providing the glass lining excellent in the stain-proof property and cleaning performance against the aqueous stains.

(4) Since the fine concave portions and convex portions are formed on the surface and the concave portions are hydrophilic, dirt is less likely to adhere on the surface and the cleaning liquid easily enters between dirt and the concave portions, so that the cleaning liquid can efficiently and easily wash away the dirt, thereby providing the glass lining excellent in the self-cleaning performance.

Herein, the conductive inorganic compound can be selected as desired from conductive oxide ceramic powders. Examples of the conductive oxide ceramic powders include a pyrochlore oxide such as zinc oxide, tin oxide, titanium oxide, zirconium oxide, potassium titanate, indium oxide, ITO (indium tin oxide), ruthenium oxide, bismuth-ruthenium oxide ($Bi_2Ru_2O_7$), indium-bismuth-ruthenium oxide ($InBiRu_2O_7$), bismuth-iridium oxide ($Bi_2Ir_2O_7$), and gadolinium-bismuth-ruthenium oxide ($GdBiRu_2O_7$); and a perovskite oxide such as barium titanate. The conductive oxide ceramic powders can be provided by coating a surface of titanium oxide or silicon dioxide ($SiO_2$) with tin oxide doped with antimony, by coating a surface of aluminum oxide ($Al_2O_3$) with indium oxide doped with tin, by doping aluminum and bismuth in zinc oxide, by coating a surface of fibrous potassium titanate with tin oxide, by containing antimony in tin oxide, and by partially substituting a predetermined site of a perovskite oxide such as barium titanate. The conductive oxide ceramic powders may be in a form of a fiber, column, stick, needle, sphere, indefinite shape and the like. The conductive oxide ceramic powders are preferably in a form of a fiber, column, stick and needle. With the above arrangement, when the base material is coated with the lining, the conductive oxide ceramic powders are arranged over a surface of the base material to form a layer, so that a contact area between the powders is increased to enable to achieve a reliable improvement in conductivity and a smooth surface of the lining.

The glass lining according to the above aspect has typical features of a glass lining described in Patent Literature 1, the features including: inhibiting electrification of the lining while maintaining corrosion resistance and surface gloss of the lining; and improving a thermal shock resistance. The glass lining also has a surface structure of the hydrophilic concave portions and the hydrophobic convex portions, in which the conductive inorganic compound is dissolved in glass to form a network (mesh). The concave portions have a hydrophilic property due to a high glass concentration while the convex portions have a hydrophobic property due to a high concentration of the conductive inorganic compound.

In the above arrangement of the invention, the conductive inorganic compound is acicular conductive antimony-containing tin oxide.

With this arrangement, the following functions and advantages are obtained in addition to the functions and advantages obtained according to the aspect of the invention.

(1) Since the conductive inorganic compound is acicular conductive antimony-containing tin oxide, thermal shock resistance is improvable, transparency is obtainable, surface smoothness and surface gloss are excellent, and generation of static electricity is inhibitable due to a small friction between the glass lining used in a reactor or the like and the contents of the reactor.

(2) Since the acicular conductive antimony-containing tin oxide is excellent in conductivity and basicity resistance, conductivity of the lining can be improved and electrification can be inhibited only by adding a small amount of the acicular conductive antimony-containing tin oxide to a frit, so that electrification of the lining can be inhibited while corrosion resistance and surface gloss of the lining are maintained.

(3) Since a predetermined amount of tin is contained, a contact angle can be improved by several degrees to about 25 degrees, thereby decreasing a contact area of particles and the like in an emulsion and a suspension to weaken adhesion force.

Herein, powders of the acicular conductive antimony-containing tin oxide for use are manufactured by firing a starting material containing a tin component and an antimony component in the presence of an alkali metal halide. The antimony component is used at an amount shown by an atom ratio of Sb/Sn ranging from 0.1/100 to 8/100, preferably from 0.3/100 to 5/100. Conductivity tends to be decreased as the amount of the antimony component becomes smaller than 0.3/100. Transparency tends to be decreased as the amount of the antimony component becomes larger than 5/100. These tendencies are unfavorably outstanding particularly when the amount of the antimony component is smaller than 0.1/100 or larger than 8/100.

In the above arrangement of the invention, an average diameter of the concave portions ranges from 10 μm to 60 μm, and a difference in height between the concave portions and the convex portions ranges from 1 μm to 3 μm.

With this arrangement, the following functions and advantages are obtained in addition to the functions and advantages obtained according to the aspect of the invention.

(1) Since the average diameter of the concave portions ranges from 10 μm to 60 μm and the difference in height between the concave portions and the convex portions ranges from 1 μm to 3 μm, the liquid is less likely to spread over the entire surface, so that the contact area can be decreased and both of water slippage and oil slippage are increased to enhance the self-cleaning performance.

Herein, most of the concave portions in a plan view are shaped substantially in a circle or ellipse, but some of the concave portions have irregular shapes. Accordingly, the average diameter of the concave portions is defined by a diameter obtained by converting a projection area of the concave portions in a plan view to an area of a circle. The average diameter of the concave portions ranges from 10 μm to 60 μm, preferably 20 μm to 50 μm. As the average diameter of the concave portions becomes smaller than 20 μm, a hydrophobic region of the glass lining surface is increased to increase a contact area with oil drops, so that oil slippage tends to be easily decreased. As the average diameter of the concave portions becomes larger than 50 μm, a hydrophilic region of the glass lining surface is increased to increase a contact area with water drops, so that water slippage tends to be easily decreased. These tendencies are unfavorably outstanding when the average diameter of the concave portions is smaller than 10 μm or larger than 60 μm. As the difference in height between the concave portions and the convex portions becomes smaller than 1 μm, the convex portions become less influential, so that water drops tend to easily adhere on the concave portions to easily decrease water slippage. As the difference in height becomes larger than 3 μm, the surface tends to become rough, so that water drops are likely to accumulate in the concave portions to easily decrease water slippage. Both of the tendencies are unfavorable.

In the above arrangement of the invention, a contact angle of water on the glass lining is 30 degrees or less.

With this arrangement, the following functions and advantages are obtained in addition to the functions and advantages obtained according to the aspect of the invention.

(1) Since the contact angle of water on the glass lining is 30 degrees or less, water easily enters between the surface of the glass lining and the oily stains and the like, so that the oily stains and the like can be floated to provide excellent stain-proof property and self-cleaning performance.

Since the surface of the glass lining is hydrophilic (i.e., the contact angle of water on the surface of the glass lining is 30 degrees or less), preferably ultra-hydrophilic (i.e., the contact angle is 10 degrees or less), the surface of the glass lining exhibits excellent stain-proof property and self-cleaning performance. When water is present on the surface, static electricity is less likely to accumulate to inhibit electrification, so that dirt is less likely to adhere on the surface to provide a stain-proof effect.

According to another aspect of the invention, a manufacturing method of the glass lining according to the above aspect of the invention includes: providing a slip containing a glass frit having a glass particle diameter ranging from 30 μm to 70 μm before the slip is used for a glass lining; and adding and mixing 3 parts by weight to 6 parts by weight of a conductive inorganic compound per 100 parts by weight of the glass frit after elapse of 40% to 75% of a total mill-grinding time.

With this arrangement, the following functions and advantages are obtained.

(1) The glass frit in the slip before the glass lining has the glass particle diameter ranging from 30 μm to 70 μm, and 3 parts by weight to 6 parts by weight of the conductive inorganic compound per 100 parts by weight of the glass frit is added and mixed after elapse of 40% to 75% of a total mill-grinding time. Accordingly, electrification of the glass lining can be inhibited while corrosion resistance and surface gloss of the lining are maintained in the same manner as in a typical GL. In addition, a network (mesh) is formed probably by aggregation of the conductive inorganic compound (though a reason of the network formation is not precisely known), thereby providing a surface structure including the plurality of hydrophilic concave portions and the net-like hydrophobic convex portions connecting peripheries of the plurality of hydrophilic concave portions. Consequently, the obtained glass lining has less adhesion of dirt than a typical GL and can maintain a stain-proof property and a self-cleaning performance for a long time after the glass lining is cleaned. Thus, the glass lining excellent in stability and durability of cleaning effects can be manufactured.

The glass particle diameter in the slip preferably ranges from 30 μm to 70 μm. As the glass particle diameter becomes smaller than 30 μm, an average diameter of the hydrophilic concave portions of the glass lining surface is decreased to increase a hydrophobic region and increase a contact area of oil drops, so that oil slippage tends to be easily decreased. As the glass particle diameter becomes larger than 70 μm, the average diameter of the hydrophilic concave portions of the glass lining surface is increased to increase a hydrophilic region and increase a contact area with water drops, so that water slippage tends to be easily decreased. Both of the tendencies are not favorable.

A content of the conductive inorganic compound is preferably 3 parts by weight to 6 parts by weight per 100 parts by weight of the glass frit. As the content of the conductive inorganic compound per 100 parts by weight of the glass frit becomes smaller than 3 parts by weight, an electrification prevention effect tends to be reduced. As the content of the conductive inorganic compound per 100 parts by weight of the glass frit becomes larger than 6 parts by weight, acid resistance of the lining is decreased and the gloss and the smoothness of the lining surface are decreased, so that dirt and the like tend to easily adhere on the surface of the lining surface. Both of the tendencies are not favorable.

The conductive inorganic compound is added and mixed after elapse of 40% to 75%, preferably 50% to 70%, of the total mill-grinding time. When the conductive inorganic compound is added before elapse of 50% of the total mill-grinding time, the grinding of the glass is insufficient to cause the glass particle size to exceed 70 μm, thereby easily impairing the surface smoothness. Moreover, the average diameter of the hydrophilic concave portions of the glass lining is increased to increase the hydrophilic region and increase the contact region of water drops, so that water slippage tends to be easily decreased. When the conductive inorganic compound is added after elapse of 70% of the total mill-grinding time, dispersion of an additive in the mill becomes difficult to cause the conductive inorganic compound to form no network, so that the above surface structure is difficult to obtain after firing. Moreover, the glass particle diameter becomes 30 μm or less and the average diameter of the hydrophilic concave portions of the glass lining surface is decreased to increase the hydrophobic region and increase the contact area with oil drops, so that oil slippage tends to be easily decreased. Moreover, these tendencies are unfavorably outstanding when the conductive inorganic compound is added before elapse of 40% or after elapse of 75% of the total mill-grinding time.

According to still another aspect of the invention, a cleaning method of glass-lined equipment including the glass lining according to the above aspect of the invention includes: irradiating the glass lining with an ultraviolet ray having an intensity ranging from 0.2 mW/cm$^2$ to 10 mW/cm$^2$.

With this arrangement, the following functions and advantages are obtained.

(1) Since an intensity of ultraviolet ray applied in an ultraviolet ray irradiation step ranges from 0.2 mW/cm$^2$ to 10 mW/cm$^2$, the glass-lined equipment can be efficiently cleaned in a short time, so that reliability and efficiency of the cleaning are excellent.

(2) When the ultraviolet ray is applied in the ultraviolet ray irradiation step, an organic substance, which is a cause for hydrophobicity and adheres on the surface of the glass-lined equipment, is converted to a free radical and decomposed by light energy of the ultraviolet ray. Accordingly, the surface of the glass-lined equipment is made hydrophilic to obtain the self-cleaning performance. Consequently, dirt is less likely to adhere and the stain-proof property after the cleaning is excellent.

(3) Since the ultraviolet ray irradiation step is performed, the contact angle on the surface of the glass-lined equipment can be decreased to reduce fluctuation of the contact angle caused by dirt and the like in the air, so that a stable contact angle can be maintained and dirt is less likely to adhere. Thus, the glass-lined equipment can exhibit excellent stain-proof property and self-cleaning performance, and stability and reliability of the cleaning effects.

The cleaning method of the glass-lined equipment is applicable to various glass-lined equipment, particularly suitably to a reactor.

Since the ultraviolet ray irradiation step is performed after a water cleaning step and a solvent cleaning step, a difficultly removable organic substance adhering on the surface of the glass-lined equipment can be decomposed by oxidation and the like, so that dirt remaining after the water cleaning step and the solvent cleaning step can be reliably removed in a short time. Thus, the reliability and the efficiency of the cleaning are excellent.

The glass-lined equipment having excellent surface smoothness and hydrophilic property can recover its inherent surface smoothness and hydrophilic property by being subjected to typical water cleaning step and solvent cleaning step and subsequently to the ultraviolet ray irradiation step, and can exhibit an excellent stain-proof property after the cleaning.

In the water cleaning step, an industrial water, tap water, ion-exchange water, distilled water, ultra-pure water, and surfactant may be selectively used as desired depending on a use condition of the glass-lined equipment.

In the solvent cleaning step, a solvent may be selectively used depending on kinds of the contents. A solvent enabling to dissolve the remaining contents is used for the cleaning. Examples of the solvent include acetone, tetrahydrofuran, methanol, toluene, and ethanol.

An inside of the reactor of the glass-lined equipment is usually cleaned by stirring water stored in the reactor. However, for instance, when a dirt amount is small, the cleaning may be performed using a spray ball and the like.

Kinds (wavelength), intensity, irradiation time and the like of the ultraviolet ray to be applied in the ultraviolet ray irradiation step may be selected depending on kinds and the like of dirt. Kinds of a light source to be used may be selected as desired.

Although the ultraviolet ray irradiation step is performed after the water cleaning step and the solvent cleaning step, the ultraviolet ray irradiation step may be performed also before a wet cleaning such as the water cleaning step and the solvent cleaning step, so that wettability of a chemical liquid and the like before the wet cleaning can be improved and the chemical liquid and the like can enter corners of the fine concave and convex portions on the surface. Accordingly, a used amount of the chemical liquid and the like can be reduced and the wet cleaning can efficiently and effectively be performed.

Any light source may be used in the ultraviolet ray irradiation step as long as the light source can apply a short wavelength ultraviolet ray (UVC) having a wavelength ranging from 100 nm to 280 nm. Suitable examples of the light source include a low-pressure mercury lamp (sterilization lamp), excimer lamp, metal halide lamp and LED lamp.

Since the ultraviolet ray applied in the ultraviolet ray irradiation step is the short wavelength ultraviolet ray having a wavelength ranging from 100 nm to 280 nm, a large light energy can break interatomic bonds of most organic compounds to decompose the organic compounds into volatile substances. Thus, the ultraviolet ray exhibits a strong sterilization effect, leading to excellent reliability and efficiency of the cleaning. Moreover, when the contact angle on the surface of the glass-lined equipment is decreased to reach the ultra-hydrophilic region, even a stubborn dirt is removable, so that the reliability and the efficiency of the cleaning are excellent. Further, since the surface of the glass-lined equipment can be sterilized and the remaining organic substances can be removed, bacteria can be prevented from growing by receiving nutrition from the remaining organic substances, so that the glass-lined equipment is hygienic and excellent in an antibiotic property and cleanness after the cleaning.

An intensity of the ultraviolet ray applied in the ultraviolet ray irradiation step differs depending on the wavelength (kinds) of the applied ultraviolet ray, irradiation time of the ultraviolet ray, kinds of dirt and the like. The intensity of the ultraviolet ray ranges from $0.2$ $mW/cm^2$ to $10$ $mW/cm^2$, preferably from $0.2$ $mW/cm^2$ to $2$ $mW/cm^2$ at normal temperature and normal humidity. As the intensity of the ultraviolet ray becomes smaller than $0.2$ $mW/cm^2$, the irradiation time of the ultraviolet ray is increased, so that the efficiency of the cleaning tends to be unfavorably easily decreased. Moreover, as the intensity of the ultraviolet ray becomes larger than $0.2$ $mW/cm^2$, handleability and energy saving property tend to be easily decreased. When the intensity of the ultraviolet ray exceeds $10$ $mW/cm^2$, it is unfavorably expected that irradiation with the ultraviolet ray over a large area without any non-uniformity is difficult.

The irradiation time of the ultraviolet ray in the ultraviolet ray irradiation step differs depending on the wavelength (kinds) of the applied ultraviolet ray, the intensity of the ultraviolet ray, kinds of dirt and the like. The irradiation time of the ultraviolet ray preferably ranges from 2 hours to 120 hours. In the above irradiation time, various dirt is reliably decomposed and the contact angle on the surface of the glass-lined equipment is decreased, so that the self-cleaning performance is improvable, and the stability and the durability of the cleaning effects are excellent. As the irradiation time of the ultraviolet ray is shorter than 2 hours, dirt cannot be sufficiently removed, so that the stain-proof property and the self-cleaning performance after the cleaning tend to be unfavorably easily decreased. As the irradiation time of the ultraviolet ray is longer than 120 hours, the cleaning requires a long time and an operation rate of the glass-lined equipment tends to be unfavorably easily decreased.

According to the glass lining, the manufacturing method of the glass lining, and the cleaning method of the glass-lined equipment of the invention, the following advantages are obtained.

According to the glass lining in the above aspect of the invention, the following advantages are obtained.

(1) The glass lining can be provided that has an excellent balance between a hydrophilic property and a hydrophobic property on its surface, that has less adhesion of dirt than a typical GL since the glass lining has an excellent stain-proof property against both oily stains and aqueous stains, and that can maintain the stain-proof property and the self-cleaning performance for a long time after the cleaning, leading to excellent stability and durability of the cleaning effects.

According to the glass lining in the above aspect of the invention, the following advantages are obtained in addition to the aforementioned advantages.

(1) The high-quality glass lining can be provided that has a high thermal shock resistance, transparency and excellent surface smoothness and surface gloss and can inhibit generation of static electricity since a friction between the glass lining used in a reactor or the like and the contents of the reactor are small.

According to the glass lining in the above aspect of the invention, the following advantages are obtained in addition to the aforementioned advantages.

(1) Since a liquid is less likely to spread over the entire surface and the contact area can be reduced, a glass lining having a high water slippage, a high oil slippage and an excellent self-cleaning performance can be obtained.

According to the glass lining in the above aspect of the invention, the following advantages are obtained in addition to the aforementioned advantages.

(1) Since water easily enters between the surface of the glass lining and oily stains and the like to float the oily stains and the like, a glass lining having excellent stain-proof property and self-cleaning performance can be provided.

According to the method of manufacturing the glass lining in the above aspect of the invention, the following advantages are obtained.

(1) Electrification of the glass lining can be inhibited while corrosion resistance and surface gloss of the glass lining are maintained in the same manner as in a typical GL. In addition, a network (mesh) is formed probably by aggregation of the conductive inorganic compound, thereby providing a surface structure of the plurality of hydrophilic concave portions and the net-like hydrophobic convex portions connecting peripheries of the plurality of hydrophilic concave portions. Consequently, the obtained glass lining has less adhesion of dirt than a typical GL and can maintain a stain-proof property and a self-cleaning performance for a long time after the glass lining is cleaned. Thus, the manufacturing method having a quality reliability and a quality stability of the glass lining excellent in stability and durability of the cleaning effects can be provided.

According to the method of cleaning the glass lining in the above aspect of the invention, the following advantages are obtained.

(1) The cleaning method for efficiently cleaning the glass-lined equipment in a short time can be provided, in which the glass-lined equipment has excellent reliability and efficiency of the cleaning and an excellent stain-proof property after the glass-lined equipment is cleaned.

BRIEF DESCRIPTION OF DRAWING(S)

DESCRIPTION OF EMBODIMENT(S)

Exemplary embodiment(s) of the invention will be described in detail below by Examples. It should be noted that the invention is by no means limited to the Examples.

Example 1

50 parts by weight of $H_2O$, 2.5 parts by weight of colloidal silica, 0.2 parts by weight of thickening polysaccharides, 0.2 parts by weight of sodium nitrite, and 1 part by weight of a white pigment (F-101: manufactured by Tokan Material Technology Co., Ltd.) were added per 100 parts by weight of a highly corrosion-resistant frit having a composition of 74.5 mol % of ($SiO_2+ZrO_2$), 20.2 mol % of ($Li_2O+Na_2O+K_2O$), 3.2 mol % of (CaO+SrO), and 2.1 mol % of the residue. The obtained mixture was subjected to mill grinding. A surface of a plate formed of an SS400 material and having a 100-mm length and a 100-mm width was glazed with the ground mixture, dried and then fired for six minutes at a temperature from 780 degrees C. to 830 degrees C. Such a lining was repeated for a plurality of times until a thickness of the obtained lining reached 1 mm, so that a test piece of Example 1 was obtained.

Example 2

A test piece of Example 2 was obtained in the same manner as that of Example 1, except that 5 parts by weight of $ZrO_2$ (H4: manufactured by NITTO DENKO CORPORATION) and 5 parts by weight of $SiO_2$ (pure silica powder: manufactured by Iwatsuki Kakou Co., Ltd.) were added per 100 parts by weight of the above highly corrosion-resistant frit and the obtained mixture was subjected to mill grinding.

The above-obtained glass is excellent in a balance between a hydrophobic oxide and a hydrophilic oxide which are uniformly dispersed over a GL surface, and is also excellent in stain-proof property against both oily stains and aqueous stains.

Example 3

A test piece of Example 3 was obtained in the same manner as that of Example 1 except that: a glass particle diameter in a slip before glass lining was determined in a range from 30 μm to 70 μm; 5 parts by weight of the acicular antimony-containing tin oxide was added per 100 parts by weight of the above highly corrosion-resistant frit after 60% of a mill-grinding time was elapsed and the obtained mixture was subjected to mill grinding; and the plate was glazed with the ground mixture, dried and fired at a temperature from 800 degrees C. to 860 degrees C. for 7.5 minutes that was longer by about 20% than in Example 1.

The test piece of Example 3, which is conductive, prevents dirt adhesion caused by static electricity and exhibits an excellent dissolution in the glass and an excellent surface gloss.

Figure 1:
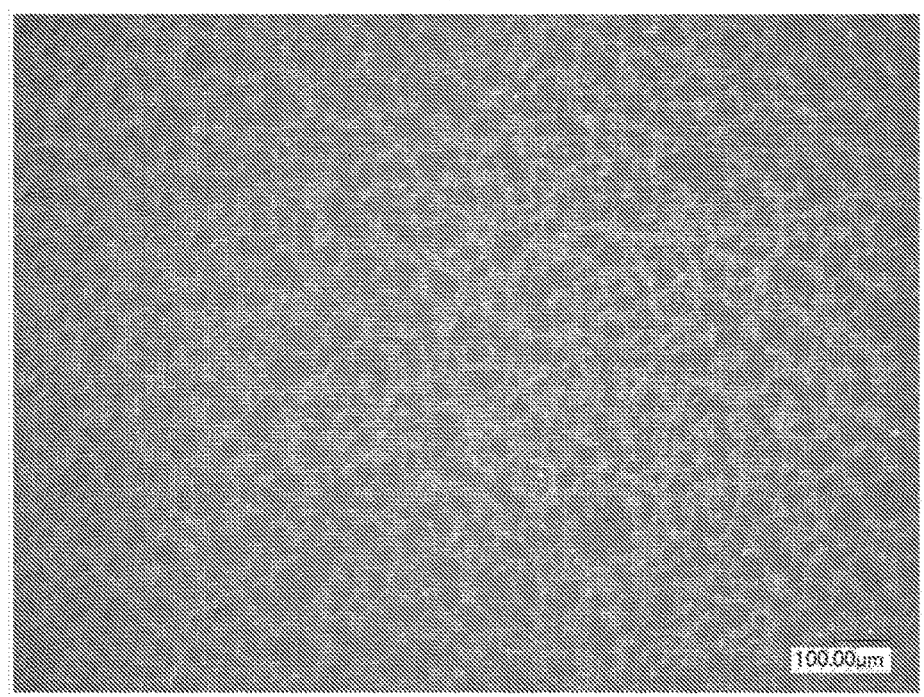
FIG. 1 shows a test piece in Example 3, a surface of which is magnified 200 times.
Figure 2:
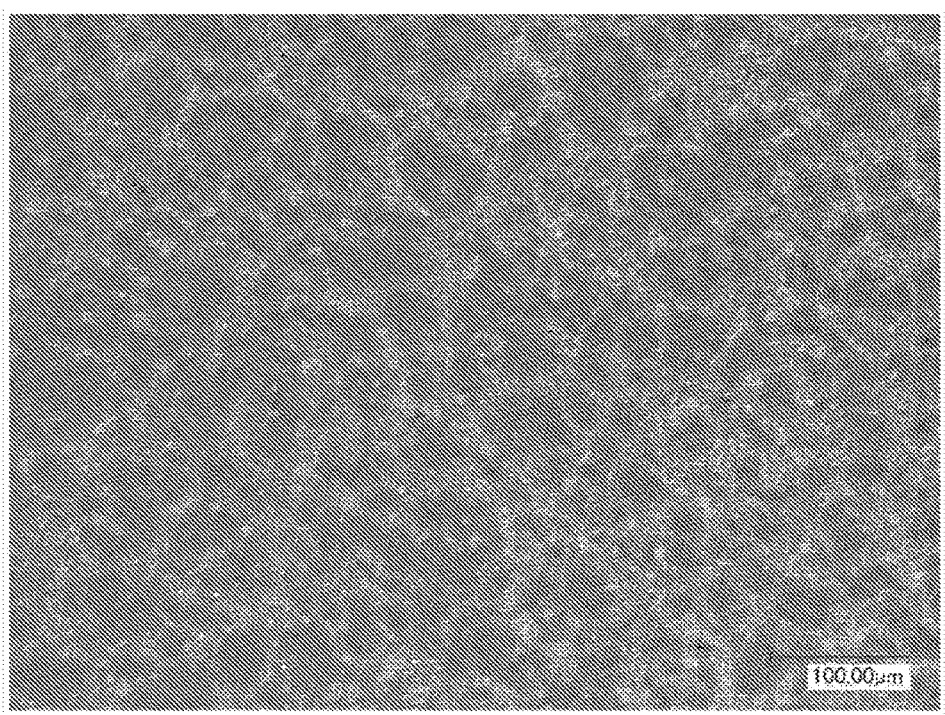
FIG. 2 shows the test piece in Example 3, the surface of which is magnified 500 times.

FIGS. 1 and 2 show images of the surface of the test piece in Example 3 taken at 200 times and 500 times magnifications using a microscope.

It is understood from FIGS. 1 and 2 that a tin oxide is dissolved in the glass in a network and a fine concave-convex surface (an average diameter of concave portions is in a range from 20 μm to 50 μm and a height difference between the concave portions and convex portions is in a range from 1 μm to 3 μm) is formed. The concave portions have a hydrophilic property due to a high glass concentration while the convex portions have a hydrophobic property due to a high concentration of the tin oxide. With this arrangement, it is considered that the surface of the glass lining is excellent in the balance between the hydrophilic property and the hydrophobic property and is also excellent in the stain-proof property and the cleaning performance against both oily stains and aqueous stains.

Test 1 (Oily Stains Repeating Test)

With respect to the test pieces of Examples 1 to 3, each surface was smeared with a vegetable oil, subsequently cleaned with a running water and a running ethanol in this sequential order, irradiated with a short-wavelength ultraviolet ray (UVC) having a wavelength from 240 nm to 270 nm at an intensity of 1 $mW/cm^2$ for 120 hours, and left still at a temperature of 20 degrees C.±5 degrees C. and a humidity of 50±10% for 100 hours in a room.

Subsequently, 5 µL of water drops (ion-exchange water) was dripped over each surface of the test pieces and a contact angle (an initial value) of each surface was measured within one minute. At the measurement of the contact angle, the temperature was 20 degrees C.±5 degrees C. and the humidity was 50±10%.

Figure 3:
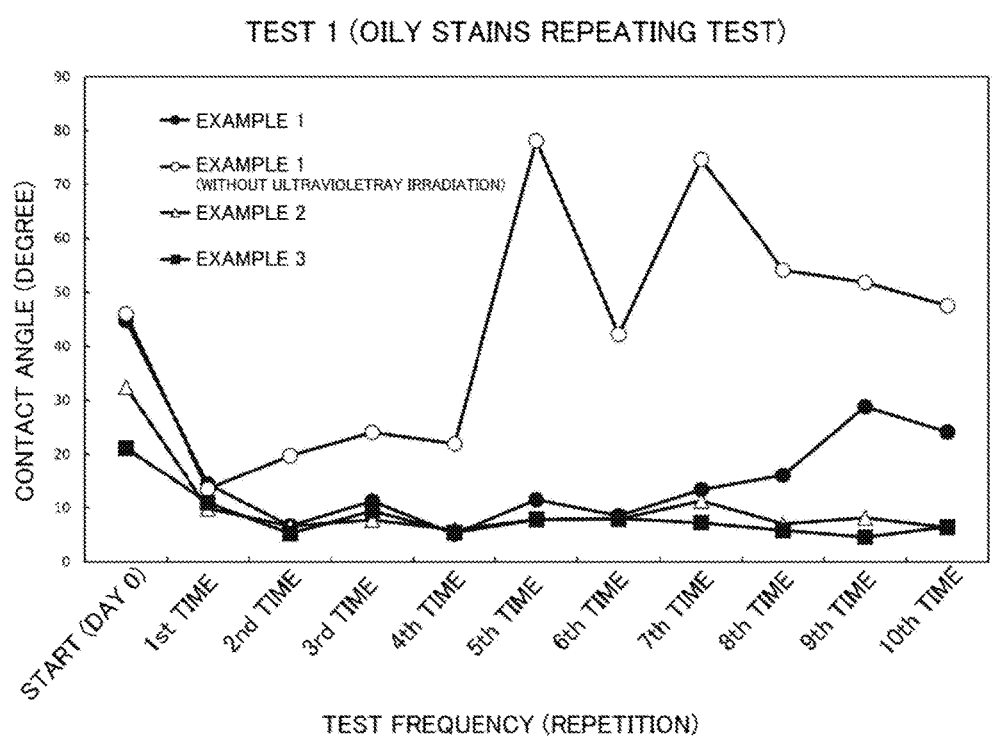
FIG. 3 shows transition of contact angles of each of the test pieces after oily stains thereof is cleaned in Examples 1 to 3.

Next, after the respective surfaces of the test pieces were smeared with a vegetable oil, the test pieces were cleaned with a running ion-exchange water and then with a running ethanol at normal temperature, and irradiated with a short-wavelength ultraviolet ray (UVC) having a wavelength from 240 nm to 270 nm at an intensity of 2 mW/cm$^2$ for 21 hours. A contact angle of each surface was measured in the same manner and conditions as described above at a temperature of 20 degrees C.±5 degrees C. and a humidity of 50±10%. For comparison, the test piece in Example 1 was also subjected only to cleaning with a running water and a running ethanol without being irradiated with ultraviolet ray. A contact angle of the surface of the test piece in Example 1 was measured in the same manner and conditions as described above. This cycle was repeated 10 times. FIG. 3 shows transition of the thus obtained contact angles of each of the test pieces.

It is understood from FIG. 3 that the initial contact angle in Example 1 was the largest, that in Example 2 is the second largest, and that in Example 3 is the smallest. It is also understood that, among the contact angles after 10 cycles of oily stains, cleaning and ultraviolet ray irradiation in Examples 1 to 3, the contact angle in Example 1 without ultraviolet ray irradiation was the largest, the contact angle in Example 1 with ultraviolet ray irradiation was the second largest, and the contact angles in Examples 2 and 3, which were equal to each other, were smaller than the contact angle in Example 1 with ultraviolet ray irradiation. It is also understood that the contact angles in Examples 2 and 3 were particularly as small as 10 degrees or less in an ultra-hydrophilic region.

Test 2 (Aqueous Stains Adhesion Test)

With respect to the test pieces of Examples 1 to 3, each surface was smeared with a vegetable oil, subsequently cleaned with a running water and a running ethanol in this sequential order, irradiated with a short-wavelength ultraviolet ray (UVC) having a wavelength from 240 nm to 270 nm at an intensity of 1 mW/cm$^2$ for 120 hours, and left still at a temperature of 20 degrees C.±5 degrees C. and a humidity of 50±10% for 100 hours in a room.

Subsequently, 5 µL of water drops (ion-exchange water) was dripped over each surface of the test pieces and a contact angle (an initial value) of each surface was measured within one minute. At the measurement of the contact angle, the temperature was 20 degrees C.±5 degrees C. and the humidity was 50±10%.

Subsequently, 5 µL of water drops (ion-exchange water) was dripped over each surface of the test pieces and a contact angle (an initial value) of each surface was measured within one minute. At the measurement of the contact angle, the temperature was 20 degrees C.±5 degrees C. and the humidity was 50±10%.

Figure 4:
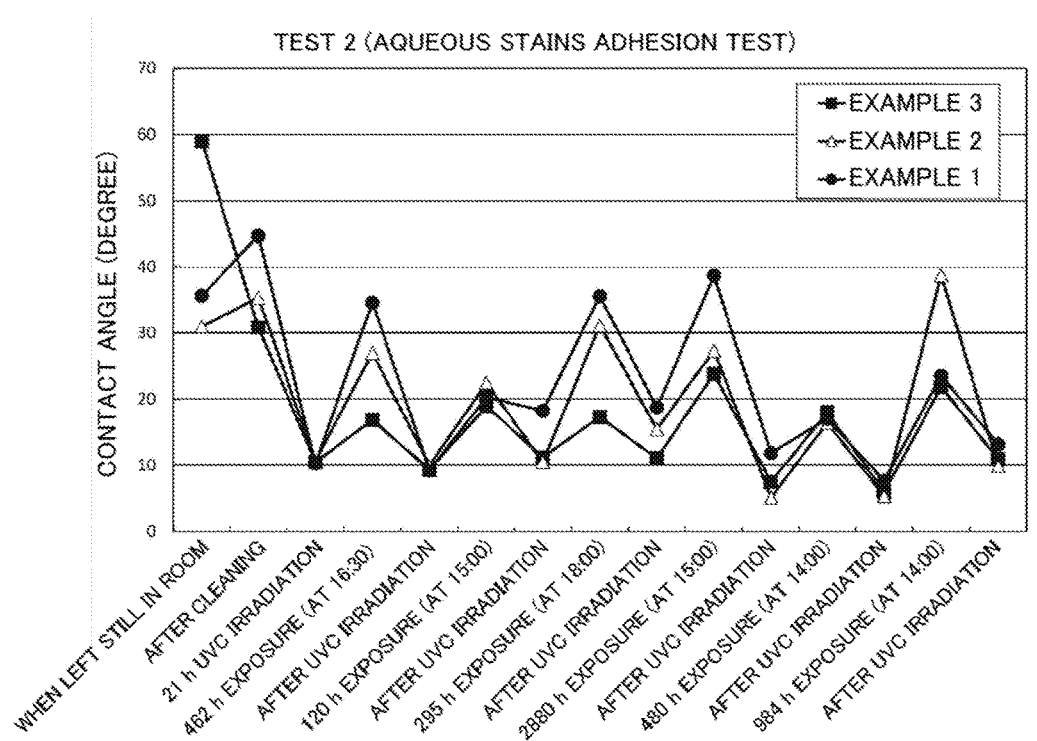
FIG. 4 shows transition of contact angles of each of the test pieces after aqueous stains thereof is cleaned in Examples 1 to 3.

Next, the test pieces were exposed to an outside at an about 15 degrees inclination while tap water was sprayed over the test pieces once every other day unless it rained. At every elapse of a predetermined time, the test pieces were cleaned with a running ion-exchange water and then with a running ethanol at normal temperature, and irradiated with a short-wavelength ultraviolet ray (UVC) having a wavelength from 240 nm to 270 nm at an intensity of 2 mW/cm$^2$ for 21 hours. A contact angle of each surface was measured in the same manner and conditions as described above at a temperature of 20 degrees C.±5 degrees C. and a humidity of 50±10%. This cycle was repeated seven times. FIG. 4 shows transition of the thus obtained contact angles of each of the test pieces.

Such a tendency is understood from the transition of the contact angles after the outside exposure shown in FIG. 4 that the contact angle in Example 1 is larger than the contact angle in Example 2 and the contact angle in Example 2 is larger than the contact angle in Example 3 immediately after the long-time exposure (i.e., before the cleaning). In particular, even the largest one of the contact angles in Example 3 was maintained at about 20 degrees in a hydrophilic region.

It is also observed that, every time after the cleaning and the ultraviolet ray irradiation, the contact angles in Examples 2 and 3 were decreased to about 10 degrees in the ultra-hydrophilic region, whereas some of the contact angles in Example 1 were decreased at most to 20 degrees.

Test 3 (Small Amount Ultraviolet Test)

With respect to the test pieces of Examples 1 to 3, each surface was smeared with a vegetable oil, subsequently cleaned with a running water and a running ethanol in this sequential order, irradiated with a short-wavelength ultraviolet ray (UVC) having a wavelength from 240 nm to 270 nm at an intensity of 1 mW/cm$^2$ for 120 hours, and left still at a temperature of 20 degrees C.±5 degrees C. and a humidity of 50±10% for 100 hours in a room.

Subsequently, 5 µL of water drops (ion-exchange water) was dripped over each surface of the test pieces and a contact angle (an initial value) of each surface was measured within one minute. At the measurement of the contact angle, the temperature was 20 degrees C.±5 degrees C. and the humidity was 50±10%.

Figure 5:
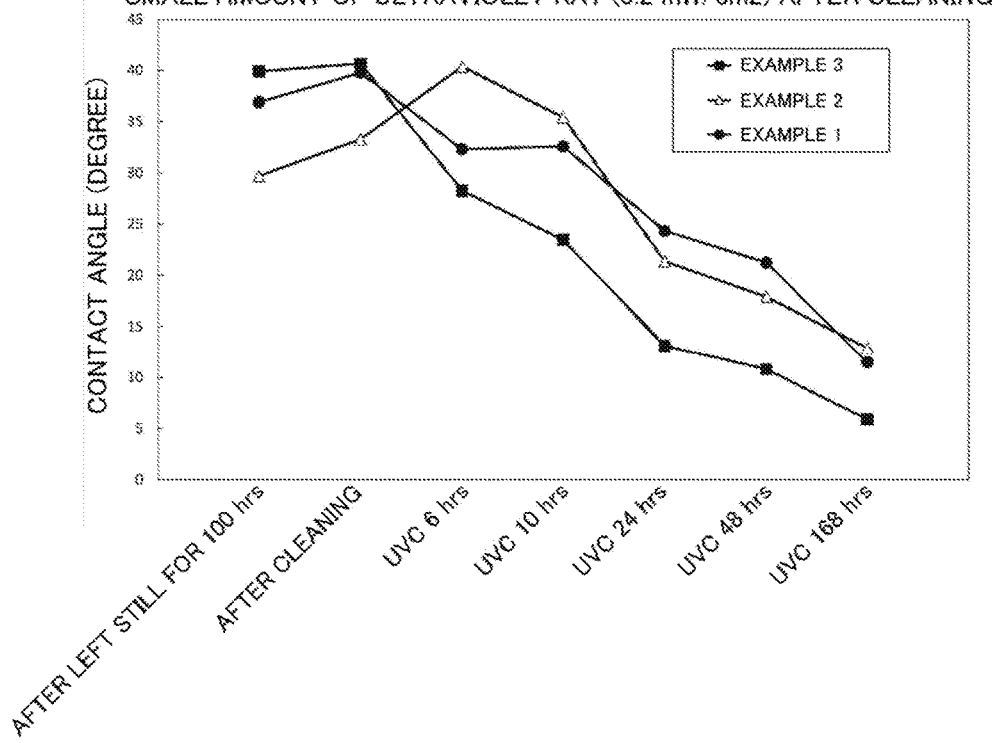
FIG. 5 shows transition of contact angles of each of the test pieces after oily stains thereof is cleaned and irradiated with a small amount of ultraviolet ray in Examples 1 to 3.

Next, after the respective surfaces of the test pieces were smeared with a vegetable oil, the test pieces were cleaned with a running ion-exchange water and then with a running ethanol at normal temperature, and irradiated with a short-wavelength ultraviolet ray (UVC) having a wavelength from 240 nm to 270 nm at an intensity of 0.2 mW/cm$^2$ for 6 hours to 168 hours. A contact angle of each surface was measured in the same manner and conditions as described above at a temperature of 20 degrees C.±5 degrees C. and a humidity of 50±10%. FIG. 5 shows transition of the thus obtained contact angles.

FIG. 5 reveals the transition of the contact angles obtained after the surface was smeared with a vegetable oil and was subjected to water cleaning, ethanol cleaning, and irradiation of a small amount of the ultraviolet ray (0.2 mW/cm$^2$). Since the contact angle in Example 3 was smaller than 15 degrees after the ultraviolet ray irradiation for about 24 hours, it was confirmed that the contact angle in Example 3 was superior to those in Examples 1 and 2 even when irradiated with the small amount of the ultraviolet ray.

In light of the above, it is found that, after use of the glass-lined equipment including the lining of the invention exhibiting excellent stain-proof property and self-cleaning performance, subjecting the glass-lined equipment to a typical cleaning such as water cleaning and solvent cleaning and the irradiation with a short wavelength ultraviolet ray (UVC) for a predetermined time can refresh a surface of the glass-lined equipment every batch to recover an inherent performance of the surface, thereby allowing the surface to maintain the stain-proof property and the self-cleaning performance for a long period of time.

The invention claimed is:

1. A glass lining comprising a lining and a conductive inorganic compound contained in the lining and having a structure comprising:
    a plurality of hydrophilic concave portions; and
    net-like hydrophobic convex portions connecting peripheries of the plurality of hydrophilic concave portions.

2. The glass lining according to claim 1, wherein the conductive inorganic compound is acicular conductive antimony-containing tin oxide.

3. The glass lining according to claim 1, wherein
    an average diameter of the concave portions ranges from 10 μm to 60 μm, and
    a difference in height between the concave portions and the convex portions ranges from 1 μm to 3 μm.

4. The glass lining according to claim 1, wherein
    a contact angle of water on the glass lining is 30 degrees or less.

5. A manufacturing method of the glass lining according to claim 1, the method comprising:
    providing a slip comprising a glass frit having a glass particle diameter ranging from 30 μm to 70 μm before the slip is used for a glass lining; and
    adding and mixing 3 parts by weight to 6 parts by weight of a conductive inorganic compound per 100 parts by weight of the glass frit after elapse of 40% to 75% of a total mill-grinding time.

6. A cleaning method of glass-lined equipment comprising the glass lining according to claim 1, the method comprising:
    irradiating the glass-lined equipment with an ultraviolet ray having an intensity ranging from 0.2 mW/cm$^2$ to 10 mW/cm$^2$.

* * * * *